(12) United States Patent
Hillan et al.

(10) Patent No.: US 10,645,651 B2
(45) Date of Patent: May 5, 2020

(54) METHODS AND APPARATUS FOR IMPROVING RE-ACTIVATION OF A NFC-F BASED REMOTE NFC DEVICE

(71) Applicant: QUALCOMM Incorporated, San Diego, CA (US)

(72) Inventors: John Hillan, Farnborough (GB); Dubai Chingalande, Farnborough (GB)

(73) Assignee: Qualcomm Incorporated, San Diego, CA (US)

( * ) Notice: Subject to any disclaimer, the term of this patent is extended or adjusted under 35 U.S.C. 154(b) by 482 days.

(21) Appl. No.: 14/057,684

(22) Filed: Oct. 18, 2013

(65) Prior Publication Data
US 2014/0370805 A1   Dec. 18, 2014

Related U.S. Application Data

(60) Provisional application No. 61/834,172, filed on Jun. 12, 2013.

(51) Int. Cl.
*H04B 5/00* (2006.01)
*H04W 52/02* (2009.01)
(Continued)

(52) U.S. Cl.
CPC .... *H04W 52/0235* (2013.01); *G06K 7/10237* (2013.01); *H04B 5/0031* (2013.01);
(Continued)

(58) Field of Classification Search
CPC .. G06K 7/10237; H04B 5/0031; H04W 4/008
(Continued)

(56) References Cited

U.S. PATENT DOCUMENTS

| 2007/0069863 A1* | 3/2007 | Akiyama | H04B 5/0056 340/10.2 |
| 2012/0045989 A1* | 2/2012 | Suumaki | H04W 8/005 455/41.1 |

(Continued)

FOREIGN PATENT DOCUMENTS

| CN | 102741858 A | 10/2012 |
| CN | 102857263 A | 1/2013 |

(Continued)

OTHER PUBLICATIONS

"Near Field Communication—Interface and Protocol (NFCIP-1)", Standard ECMA—340, 3rd Edition, Jun. 2013

(Continued)

*Primary Examiner* — Nguyen T Vo
*Assistant Examiner* — Max Mathew
(74) *Attorney, Agent, or Firm* — Arent Fox LLP (57) ABSTRACT

Techniques for improving re-activation of an NFC-F based remote near field communication (NFC) device are described. A polling NFC device may be configured to determine that an NFC-F based remote NFC device was previously deactivated, and transmit a sense request message to enable the remote NFC device to receive an attribute request message as part of a device activation procedure. A polling NFC device may be configured to set a sleep flag to indicate that a deselected NFC-F based remote NFC device is in a sleep sub-state. The polling NFC device may be configured to determine that the remote NFC device is to be activated as a type 3 tag, as part of a device activation procedure, and reset the sleep flag to indicate that the remote NFC device is no longer in the sleep sub-state based on the determination.

12 Claims, 7 Drawing Sheets

(51) Int. Cl.
*H04W 4/80* (2018.01)
*G06K 7/10* (2006.01)

(52) U.S. Cl.
CPC ............... *H04W 4/80* (2018.02); *Y02D 70/00* (2018.01); *Y02D 70/10* (2018.01); *Y02D 70/1222* (2018.01); *Y02D 70/1224* (2018.01); *Y02D 70/1242* (2018.01); *Y02D 70/1262* (2018.01); *Y02D 70/14* (2018.01); *Y02D 70/142* (2018.01); *Y02D 70/144* (2018.01); *Y02D 70/146* (2018.01); *Y02D 70/162* (2018.01); *Y02D 70/166* (2018.01); *Y02D 70/22* (2018.01); *Y02D 70/42* (2018.01)

(58) Field of Classification Search
USPC .................................................. 455/41.1–41.2
See application file for complete search history.

(56) References Cited

U.S. PATENT DOCUMENTS

| | | | |
|---|---|---|---|
| 2012/0202423 A1* | 8/2012 | Tiedemann | H04W 52/0254 455/41.1 |
| 2012/0231734 A1* | 9/2012 | Symons | H04B 5/0075 455/41.1 |
| 2012/0309302 A1* | 12/2012 | Buhot | G06K 7/10237 455/41.1 |
| 2012/0309303 A1* | 12/2012 | Hillan | H04B 5/0031 455/41.1 |
| 2013/0052950 A1* | 2/2013 | Hillan | H04W 8/005 455/41.1 |
| 2013/0102247 A1 | 4/2013 | Hillan et al. | |
| 2013/0203349 A1* | 8/2013 | Hillan | H04B 5/02 455/41.1 |
| 2014/0073242 A1* | 3/2014 | Chen | H04B 5/0056 455/41.1 |
| 2014/0370805 A1* | 12/2014 | Hillan | H04W 4/80 455/41.1 |
| 2015/0162954 A1* | 6/2015 | Socol | H04W 4/80 455/41.1 |
| 2015/0341745 A1* | 11/2015 | Deluca | H04B 5/0031 455/41.1 |
| 2015/0378448 A1* | 12/2015 | Trond | G06F 3/03545 345/173 |

FOREIGN PATENT DOCUMENTS

| | | |
|---|---|---|
| CN | 102893327 A | 1/2013 |
| CN | 103096486 A | 5/2013 |
| EP | 2 216 914 A2 | 8/2010 |
| EP | 2 458 898 A2 | 5/2012 |
| JP | 2004-215225 A | 7/2004 |
| JP | 2007-094601 A | 4/2007 |
| JP | 2010-130310 A | 6/2010 |
| JP | 2012-118569 A | 6/2012 |

OTHER PUBLICATIONS

NFC Digital Protocol Technical Specification NFC Forum Digital 1.0 NFCForum-TS-DigitalProtocol-1.0, NFC Forum, Nov. 17, 2010.
Information technology—Telecommunications and information exchange between systems—Near Field Communication—Interface and Protocol (NFCIP-1). International Standard ISO/IEC., vol. 18092, No. 1st edition, Apr. 1, 2004, XP007905654, pp. 1-33.
International Search Report and Written Opinion dated Jul. 28, 2014; Application No. PCT/US2014/036727 (total pp. 13).

* cited by examiner

METHODS AND APPARATUS FOR IMPROVING RE-ACTIVATION OF A NFC-F BASED REMOTE NFC DEVICE

CLAIM OF PRIORITY UNDER 35 U.S.C. § 119

The present Application for Patent claims priority to Provisional Application No. 61/834,172 entitled "METHODS AND APPARATUS FOR IMPROVING RE-ACTIVATION OF A NFC-F BASED REMOTE NFC DEVICE" filed Jun. 12, 2013, and assigned to the assignee hereof and hereby expressly incorporated by reference herein.

BACKGROUND

The disclosed aspects relate generally to communications between devices and specifically to methods and systems for improving re-activation of a remote Near Field Communication (NFC) device that is supported by an NFC-F access technology.

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are being manufactured with relatively large increases in computing capabilities, and as such, are becoming tantamount to small personal computers and hand-held PDAs. Further, such devices are being manufactured to enable communications using a variety of frequencies and applicable coverage areas, such as cellular communications, wireless local area network (WLAN) communications, NFC, etc.

When NFC is implemented, an NFC-enabled device may initially detect an NFC tag and/or target device. Thereafter, communications between peer NFC devices may be performed using an NFC data exchange protocol (NFC-DEP) communication link. Currently, the NFC Forum Activity specification version 1.0 does not address all functionality required in order to activate and/or reactivate an NFC-DEP communication link for NFC-F-based devices. During Device Activation for a remote NFC device that supports NFC-F, according to the NFC Forum Activity Specification version 1.0, the poll side Device Activation activity for NFC-F does not match the needs of the remote NFC device when the remote NFC device is in a SLEEP_AF Sub-state.

For example, when activating a remote NFC device with NFC-DEP protocol using NFC-F, the present NFC Forum Activity Specification indicates that an attribute request (ATR_REQ) is sent, but the current listen state machine definition for the SLEEP_AF Sub-state requires the remote device to ignore the ATR_REQ.

Thus, improvements in facilitating re-activation of a remote NFC device that is supported by a NFC-F access technology may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of inductive communications is described. The method may include determining, by a polling near field communication (NFC) device, that a remote NFC device that is supported by an NFC-F access technology was previously deactivated. The method may include transmitting a sense request message to enable the remote NFC device to receive an attribute request message as part of a device activation procedure.

In an aspect, a computer program product for inductive communications is described. The computer program product may include a non-transitory computer-readable medium comprising code. The code may cause a computer to determine, by a polling near field communication (NFC) device, that a remote NFC device that is supported by an NFC-F access technology was previously deactivated. The code may cause a computer to transmit a sense request message to enable the remote NFC device to receive an attribute request message as part of a device activation procedure.

In an aspect, an apparatus for inductive communications is described. The apparatus may include means for determining, by a polling near field communication (NFC) device, that a remote NFC device that is supported by an NFC-F access technology was previously deactivated. The apparatus may include means for transmitting a sense request message to enable the remote NFC device to receive an attribute request message as part of a device activation procedure.

In an aspect, a polling near field communication (NFC) device apparatus for inductive communications is described. The polling NFC device apparatus may include a transceiver, a memory, a processor coupled to the memory, and an NFC-F device activation module coupled to at least one of the memory or the processor. The NFC-F device activation module may be configured to determine that a remote NFC device that is supported by an NFC-F access technology was previously deactivated. The NFC-F device activation module may be configured to transmit a sense request message to enable the remote NFC device to receive an attribute request message as part of a device activation procedure.

In an aspect, a method of inductive communications is described. The method may include setting, by a polling near field communication (NFC) device, a sleep flag to indicate that a deselected remote NFC device that is supported by an NFC-F access technology is in a sleep sub-state. The method may include determining that the remote NFC device is to be activated as a type 3 tag as part of a device activation procedure. The method may include resetting the sleep flag to indicate that the remote NFC device is no longer in the sleep sub-state based on the determination.

In an aspect, a computer program product for inductive communications is described. The computer program product may include a non-transitory computer-readable medium comprising code. The code may cause a computer to set, by a polling near field communication (NFC) device, a sleep flag to indicate that a deselected remote NFC device that is supported by an NFC-F access technology is in a sleep sub-state. The code may cause a computer to determine that the remote NFC device is to be activated as a type 3 tag as part of a device activation procedure. The code may cause a computer to reset the sleep flag to indicate that the remote NFC device is no longer in the sleep sub-state based on the determination.

In an aspect, an apparatus for inductive communications is described. The apparatus may include means for setting, by a polling near field communication (NFC) device, a sleep flag to indicate that a deselected remote NFC device that is supported by an NFC-F access technology is in a sleep sub-state. The apparatus may include means for determining that the remote NFC device is to be activated as a type 3 tag as part of a device activation procedure. The apparatus may include means for resetting the sleep flag to indicate that the remote NFC device is no longer in the sleep sub-state based on the determination.

In an aspect, a polling near field communication (NFC) device apparatus for inductive communications is described. The polling NFC device apparatus may include a transceiver, a memory, a processor coupled to the memory, and an NFC-F device activation module coupled to at least one of the memory or the processor. The NFC-F device activation module may be configured to set a sleep flag to indicate that a deselected remote NFC device that is supported by an NFC-F access technology is in a sleep sub-state. The NFC-F device activation module may be configured to determine that the remote NFC device is to be activated as a type 3 tag as part of a device activation procedure. The NFC-F device activation module may be configured to reset the sleep flag to indicate that the remote NFC device is no longer in the sleep sub-state based on the determination.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Generally, an NFC device may recognize an NFC target device and/or tag when the NFC device is within range of a coverage area of the NFC target device and/or tag. Thereafter, the NFC device may obtain sufficient information to establish communications with the NFC target device and/or tag. One form of communications that may be established is between peer NFC devices (e.g., an NFC data exchange protocol (DEP) (NFC-DEP)-based communications link). As described herein, communications between NFC devices may be enabled over a variety of NFC access technologies, such as, but not limited to, NFC-A, NFC-F, etc.

Figure 1:
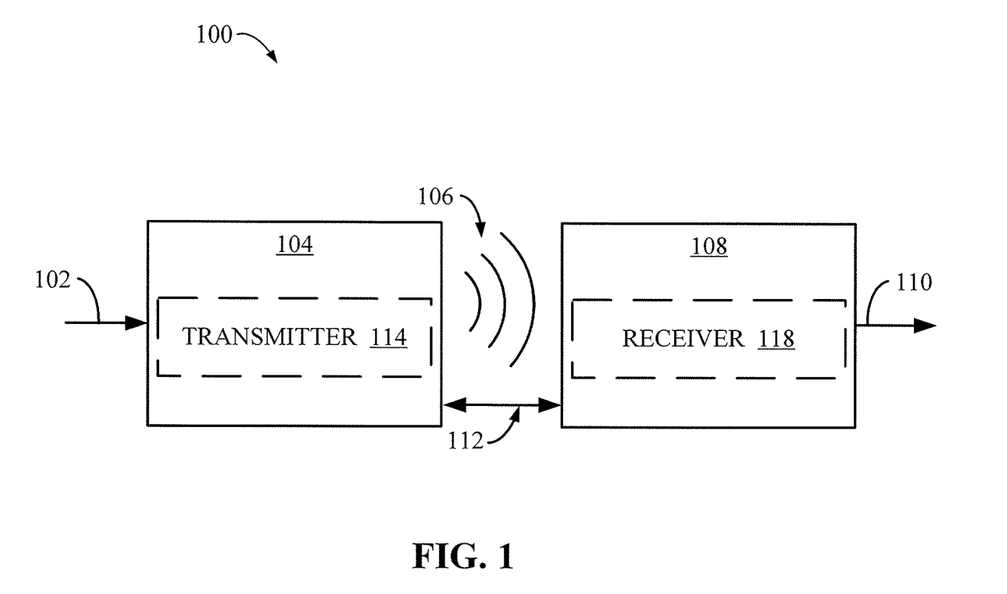
FIG. 1 is a simplified block diagram of an induction-based communications system, according to an aspect.

FIG. 1 illustrates a wireless transmission- and/or induction-based communication system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
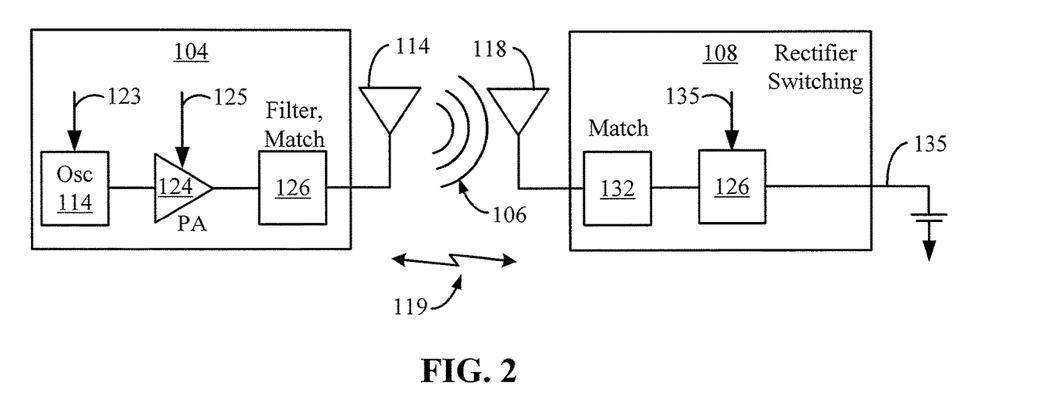
FIG. 2 is a simplified schematic diagram of an induction-based communications system, according to an aspect.

FIG. 2 is a schematic diagram of an example near field inductive communications system. The transmitter 104 includes an oscillator 122, a power amplifier 124 and a filter and matching circuit 126. The oscillator is configured to generate a signal at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, Zigbee, cellular, etc).

Figure 3:
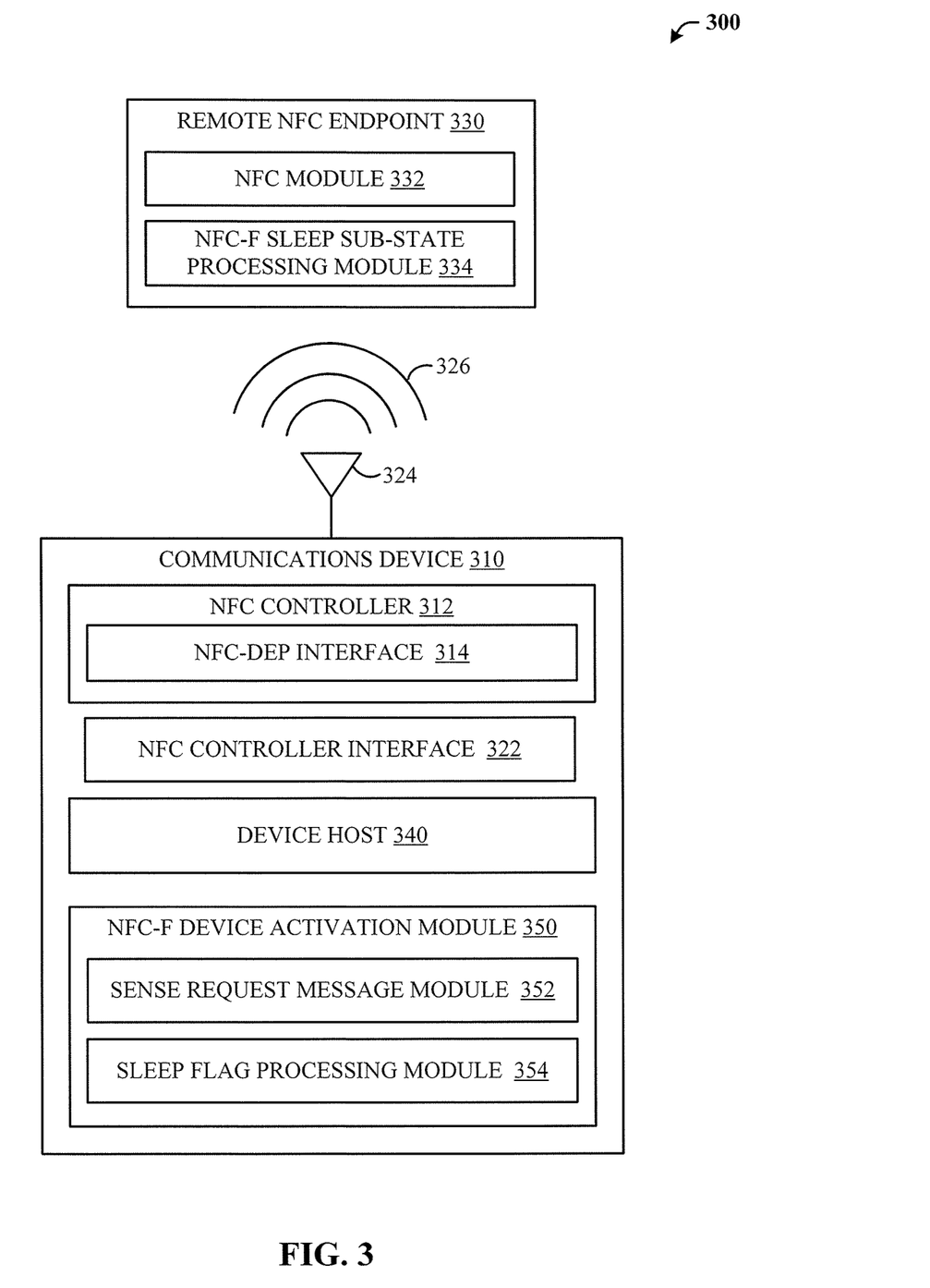
FIG. 3 is a block diagram of an NFC environment, according to an aspect.

With reference to FIG. 3, a block diagram of a communication network 300 according to an aspect is illustrated. Communication network 300 may include communications device 310 which, through antenna 324, may be in inductive communication with a remote NFC endpoint 330 using one or more NFC technologies 326 (e.g., NFC-A, NFC-B, NFC-F, etc.). In one aspect, remote NFC endpoint 330 may be operable to communicate with other devices through NFC module 332. In another aspect, communications device 310 may be operable to connect remote NFC endpoint 330 to an access network and/or core network (e.g., a CDMA network, a GPRS network, a UMTS network, and other types of wireline, wireless, and induction-based communications networks).

As part of enabling communications between communications device 310 and remote NFC endpoint 330, the remote NFC endpoint 330 may be activated (e.g., as part of a device activation procedure), may communicate (e.g., as part of a data exchange procedure), and/or may be deactivated (e.g., as part of a device deactivation procedure). When the remote NFC endpoint 330 has been deactivated it may enter a sleep sub-state (e.g., SLEEP_AF sub-state). In an aspect, to be able to communicate with the communications device 310, the remote NFC endpoint 330 may be in a ready sub-state. In an operational aspect, NFC-F sleep sub-state process module 334 may be configured to receive and process an attribute request (e.g., ATR_REQ) message as part of a device activation procedure. In response to receipt of the attribute request message, NFC-F sleep sub-state process module 334 may allow the remote NFC endpoint 330 to switch from the sleep sub-state to a ready sub-state, and indicate this switch to communications device 310 by sending an attribute response (e.g., ATR_RES) message.

In one aspect, communications device 310 may include an NFC controller 312, an NFC controller interface (NCI) 322, and device host 340. In one aspect, NFC controller 312 may be operable to obtain, through NCI 322, information from remote NFC endpoint 330, which may be provided to communications device 310 via NFC module 332. During communications with remote NFC endpoint 330, NFC controller 312 may operate using an NFC-DEP interface 314.

Communications device 310 may further include NFC-F device activation module 350 configured to facilitate efficient communications with a remote NFC endpoint that is supported by NFC-F technology (e.g., remote NFC endpoint 330 in the present example) and that may be in a sleep sub-state. In an aspect, NFC-F device activation module 350 may include sleep flag processing module 354 configured to set a sleep flag when a deselection request (e.g., DSL_REQ) message sent to a remote NFC endpoint 330 that is supported by NFC-F and/or NFC-A access technologies. Further, sleep flag processing module 354 may be configured to clear such a sleep flag upon successful reactivation of the remote NFC endpoint 330. Still further, upon setting the sleep flag, and if NFC-F device activation module 350 determines to use an NFC-F access technology to communicate with remote NFC endpoint 330 via NFC-DEP, sense request message module 352 may be configured to send a sense request for NFC-F (e.g., SENSF_REQ) to remote NFC endpoint 330 before sending an attribute request message. In such an aspect, the sense request message allows the remote NFC endpoint 330 to first switch to a ready sub-state, which in turn allows the remote NFC endpoint 330 to successfully receive and process the attribute request message.

In another aspect, where the remote NFC endpoint 330 is activated as a type 3 tag after having previously being deselected, sleep flag processing module 354 may be configured to clear the sleep flag that was set during the device deactivation procedure.

As such, communications network 300 provides an environment to allow efficient communications between communications device 310 and remote NFC endpoint 330, where the remote NFC endpoint 330 is supported by NFC-F technology and may be deactivated and/or activated during such communications.

Figure 4:
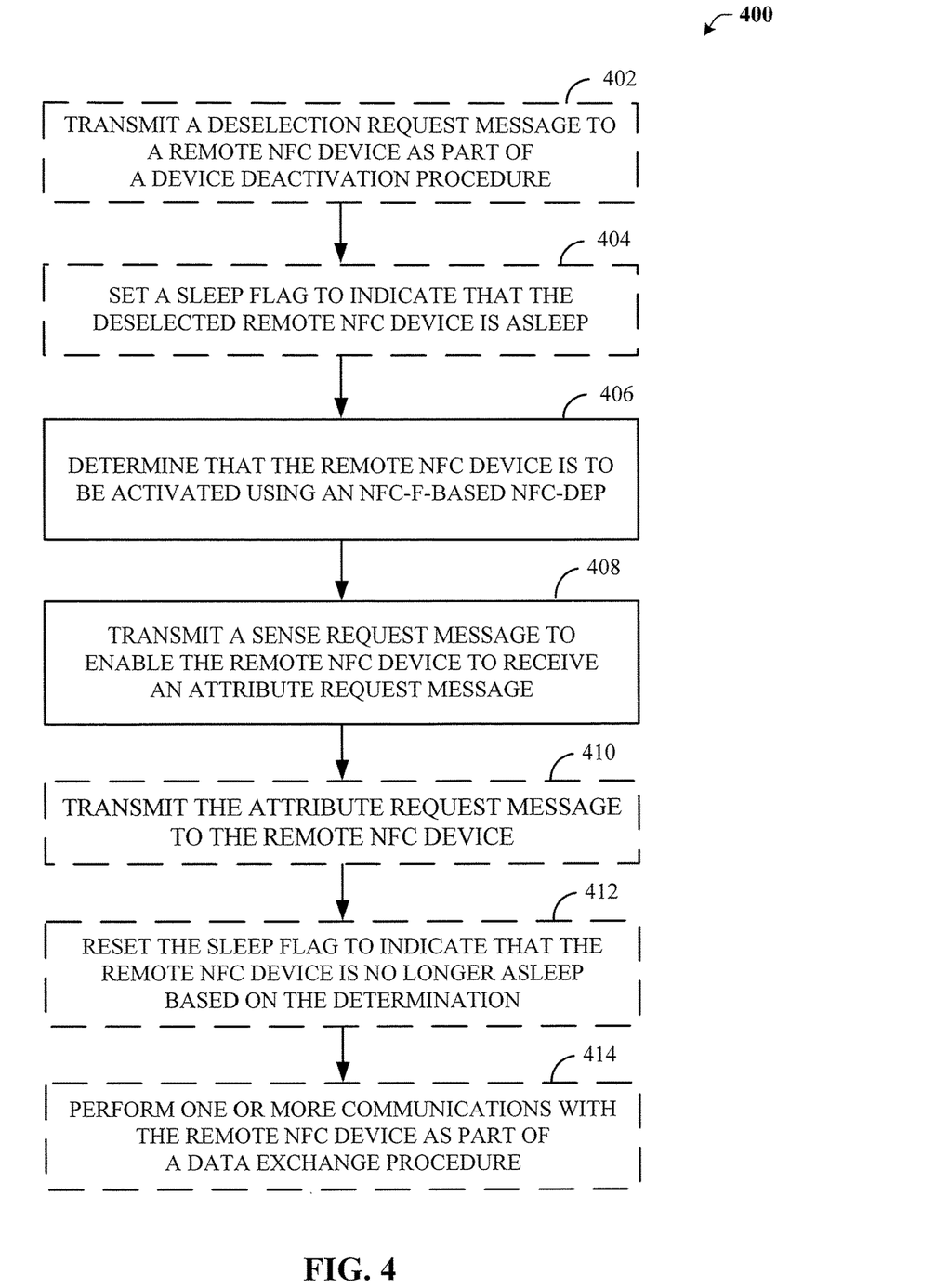
FIG. 4 is a flowchart describing an example for improving re-activation of a remote NFC device that is supported by a NFC-F access technology, according to an aspect.
Figure 5:
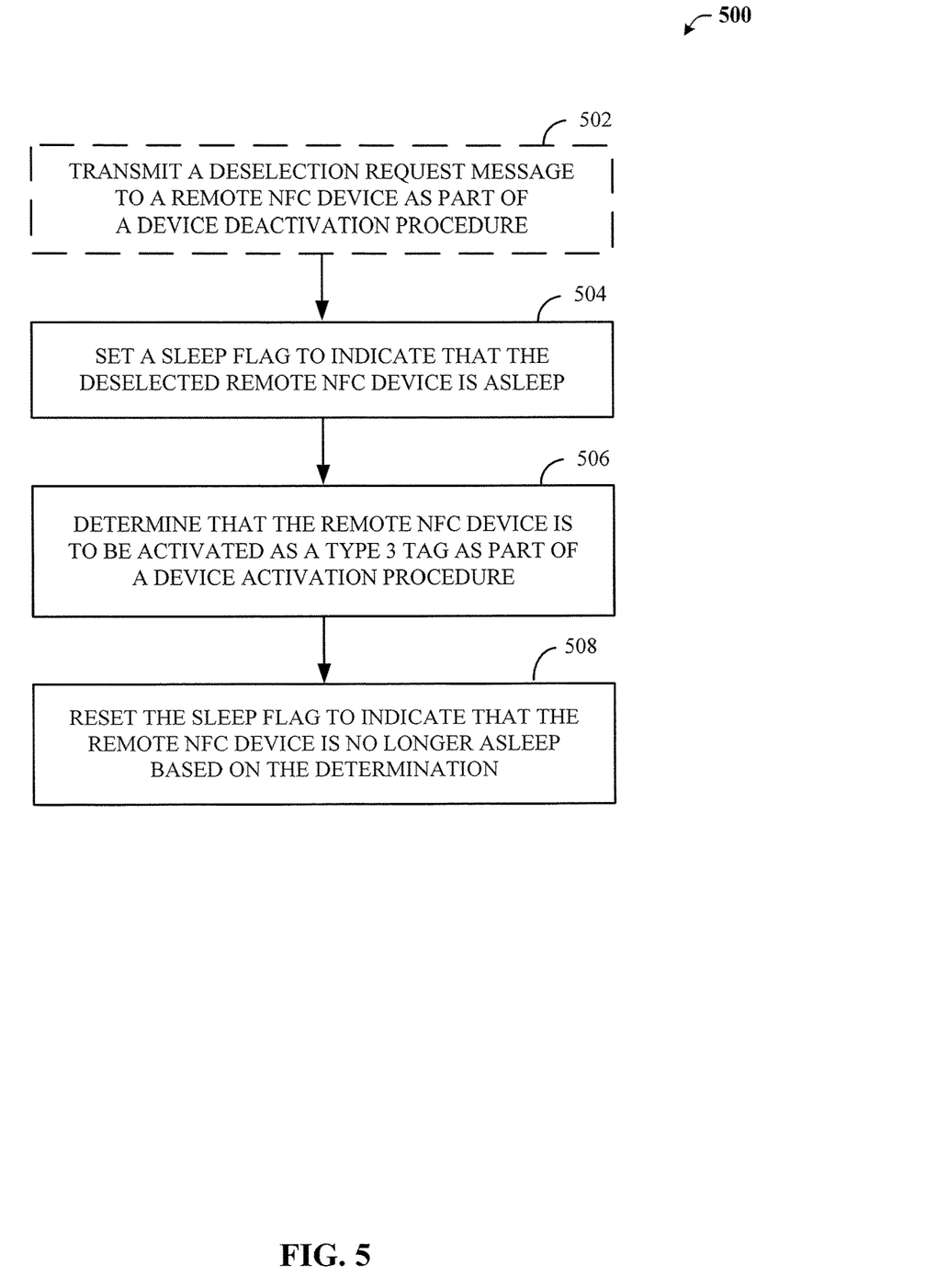
FIG. 5 is a flowchart describing an example for improving re-activation of a remote NFC device that is supported by a NFC-F access technology, according to an aspect.
Figure 6:
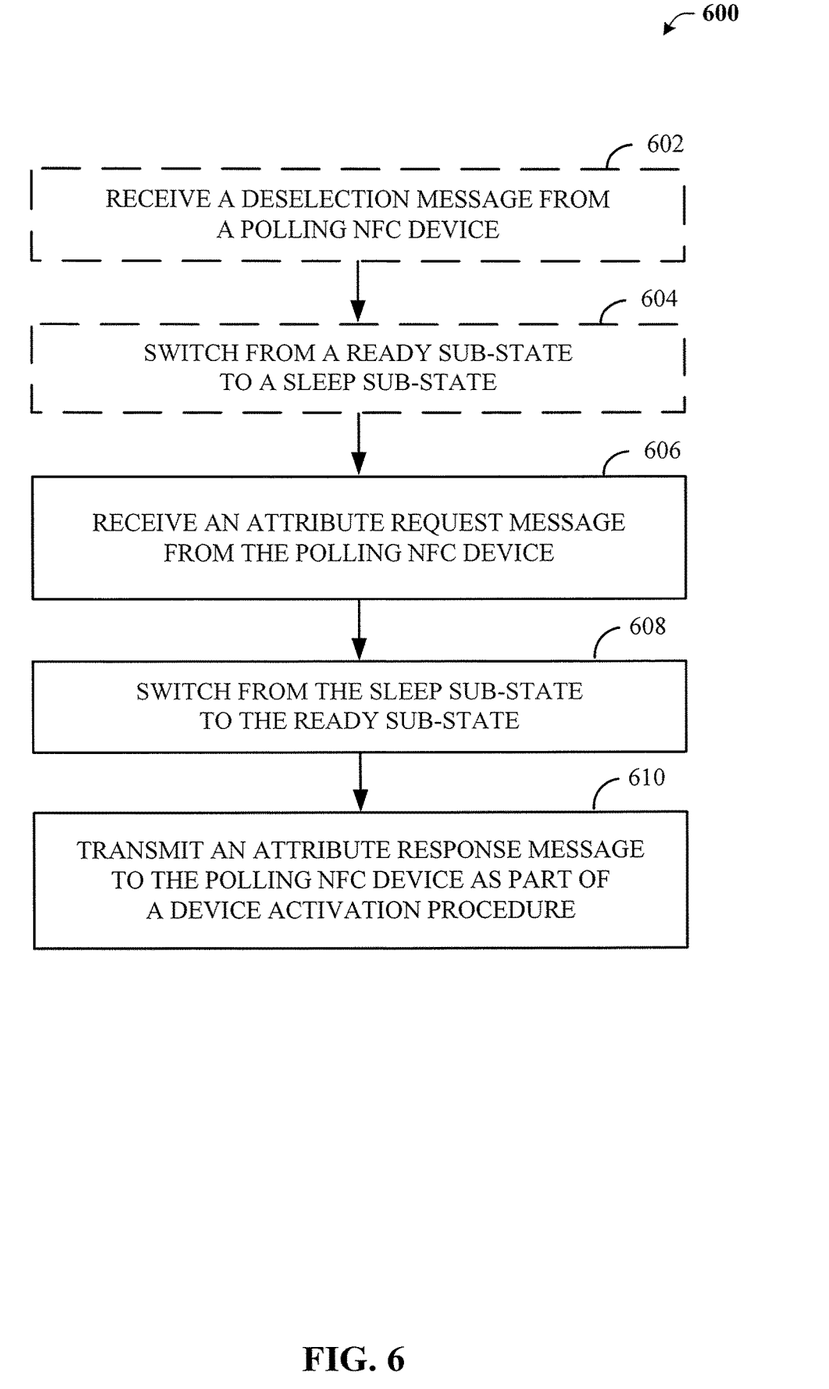
FIG. 6 is a flowchart describing an example for improving re-activation of a remote NFC device that is supported by a NFC-F access technology, according to an aspect.

FIGS. 4-6 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Further, with respect to the processes 400, 500, and 600 described in FIGS. 4-6, one of ordinary skill in the art would understand that each process may be performed separately. Additionally, or in the alternative, any combination of the processes 400, 500, and 600 may be performed together. For example, the polling NFC device-based processes 400 and 500 may be performed without the listening NFC device-based process 600. In another example, the listening NFC device-based process 600 may be performed without the polling NFC device-based processes 400 and 500.

With reference now to FIG. 4, an example flowchart describing a process 400 for providing improved activation and/or deactivation for communications with NFC-F-based remote NFC endpoints. In an aspect, the process may be performed by a polling NFC device, such as, for example, communications device 310 of FIG. 3 and/or communications device 700 of FIG. 7, each of which may be in communication with a remote NFC device (e.g., communications device 310 is in communication with remote NFC endpoint 330, both of FIG. 3).

Figure 7:
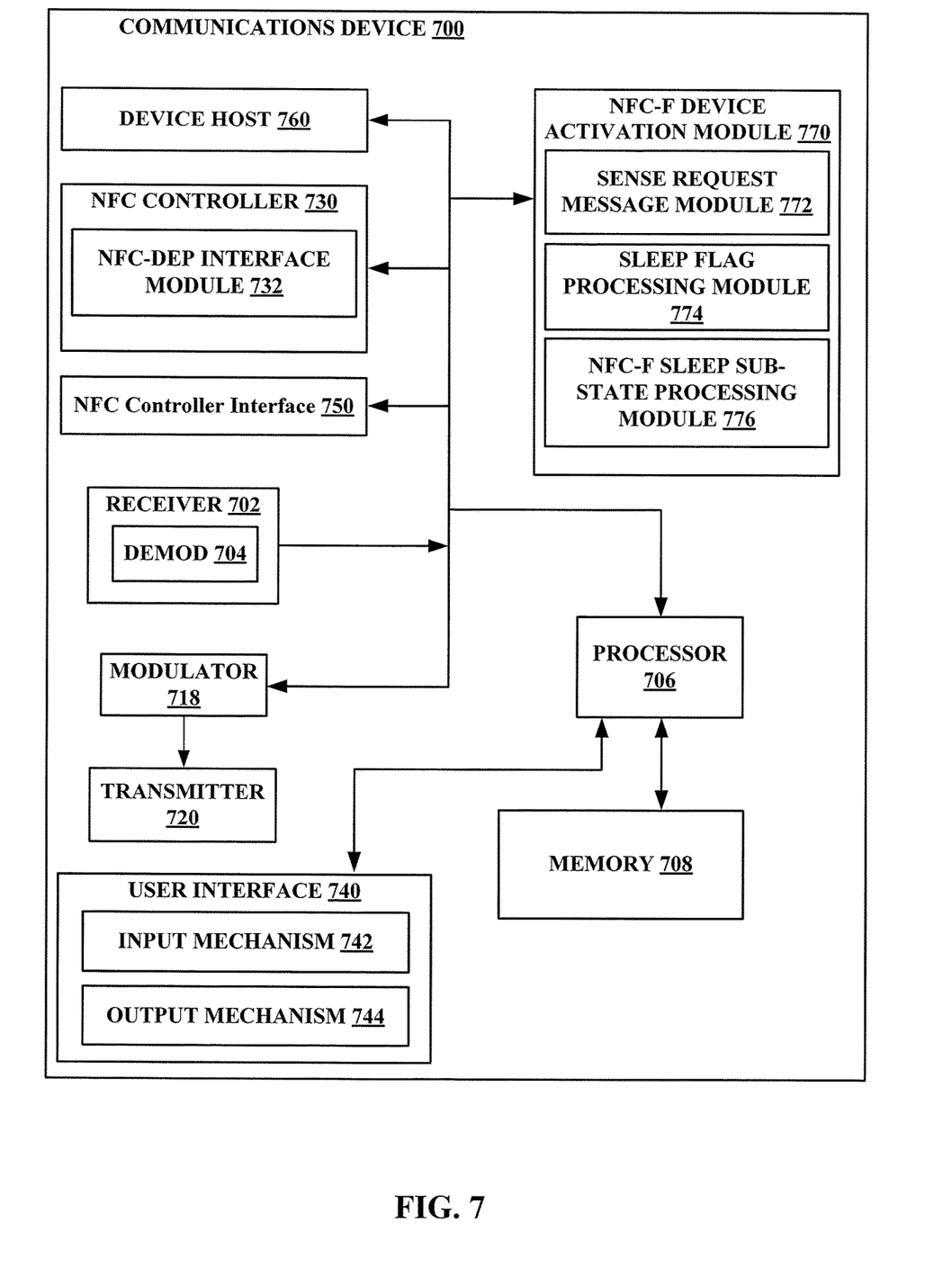
FIG. 7 illustrates a block diagram example architecture of a communications device, according to an aspect.

In an optional aspect, at block 402, a polling NFC device may transmit a deselection request message to a remote NFC device as part of a Device Deactivation procedure. In an aspect, communications device 700, which represents a polling NFC device, may be configured to transmit a deselection request message to a remote NFC device (e.g., remote NFC endpoint 330 of FIG. 3) as part of a Device Deactivation procedure. More particularly, transmitter 720, processor 706, DH 760, and/or NFC-F device activation module 770, all included within communications device 700 may be configured to perform such a transmission. In an aspect, the deselection request may be a DSL_REQ message as defined by the NFC Forum Digital Protocol specification.

In another optional aspect, at block 404, the polling NFC device may set a sleep flag to indicate that the deselected remote NFC endpoint is in a sleep sub-state. In an aspect, communications device 700 may be configured to set a sleep flag to indicate that the deselected remote NFC endpoint is in a sleep sub-state. More particularly, processor 706, DH 760, and/or sleep flag processing module 774 of communications device 700 may be configured to set the sleep flag. In an aspect, the sleep flag may be set when the remote NFC endpoint is using an NFC-A or NFC-F access technology.

At block 406, the polling NFC device may determine that the remote NFC device is to be activated using NFC-DEP and based on NFC-F access technology. In an aspect, communications device 700 may be configured to determine that the remote NFC device is to be activated using NFC-DEP and based on NFC-F access technology. More particularly, processor 706, DH 760, and/or NFC-F device activation module 770 of communications device 700 may be configured to make such a determination.

At block 408, the polling NFC device may transmit a sense request message to the remote NFC device in response to the determination. In an aspect, communications device 700 may be configured to transmit a sense request message to the remote NFC device in response to the determination. More particularly, transmitter 720, processor 706, DH 760, and/or sense request message module 772 of communications device 700 may be configured to perform such a transmission. In an aspect, the sense request may be a SENSF_REQ message as defined by the NFC Forum Digital Protocol specification. The sense request message allows the remote NFC endpoint to switch from a sleep sub-state to a ready sub-state thereby allowing the remote NFC endpoint to process future messages, such as, but not limited to, an attribute request message.

In an optional aspect, at block 410, the polling NFC device may transmit an attribute request message after the sense request message has been sent. In an aspect, communications device 700 may be configured to transmit an attribute request message after the sense request message has been sent. More particularly, transmitter 720, processor 706, DH 760, and/or NFC-F device activation module 770 of communications device 700 may be configured to perform such a transmission. In an aspect, the attribute request may be an ATR_REQ message as defined by the NFC Forum Digital Protocol specification.

In another optional aspect, at block 412, the polling NFC device may reset the sleep flag to indicate that the remote NFC endpoint is no longer in the sleep sub-state. In an aspect, communications device 700 may be configured to reset the sleep flag to indicate that the remote NFC endpoint is no longer in the sleep sub-state. More particularly, processor 706, DH 760, and/or sleep flag processing module 774 of communications device 700 may be configured to reset the sleep flag.

Thereafter, in an optional aspect, at block 414, the polling NFC device may perform various communications with the remote NFC endpoint as part of a data exchange procedure. In an aspect, communications device 700, via receiver 702, transmitter 720, processor 706, and/or other components, may communicate with the remote NFC endpoint as usual.

With reference now to FIG. 5, another example flowchart describing a process 500 for providing improved activation and/or deactivation for communications with NFC-F based remote NFC endpoints. In an aspect, the process 500 may be performed by a polling NFC device, such as, for example, communications device 310 of FIG. 3 and/or communications device 700 of FIG. 7, each of which may be in communication with a remote NFC device (e.g., communications device 310 is in communication with remote NFC endpoint 330, both of FIG. 3).

In an optional aspect, at block 502, a polling NFC device may transmit a deselection request message to a remote NFC device as part of a Device Deactivation procedure. In an aspect, communications device 700 may be configured to transmit a deselection request message to a remote NFC device as part of a Device Deactivation procedure. More particularly, transmitter 720, processor 706, DH 760, and/or NFC-F device activation module 770 of communications device 700 may be configured to perform such a transmission. In an aspect, the deselection request may be a DSL_REQ message as defined by the NFC Forum Digital Protocol specification.

At block 504, the polling NFC device may set a sleep flag to indicate that the deselected remote NFC endpoint is in a sleep sub-state. In an aspect, communications device 700 may be configured to set a sleep flag to indicate that the deselected remote NFC endpoint is in a sleep sub-state. More particularly, processor 706, DH 760, and/or sleep flag processing module 774 of communications device 700 may be configured to set the sleep flag. In an aspect, the sleep flag may be set when the remote NFC endpoint is using an NFC-A or NFC-F access technology.

At block 506, the polling NFC device may determine that the remote NFC device is to be activated as a type 3 tag. In an aspect, communications device 700 may be configured to determine that the remote NFC device is to be activated as a type 3 tag. More particularly, processor 706, DH 760, and/or NFC-F device activation module 770 of communications device 700 may be configured to perform such a determination.

At block 508, the polling NFC device may reset the sleep flag to indicate that the remote NFC endpoint is no longer in the sleep sub-state. In an aspect, communications device 700 may be configured to reset the sleep flag to indicate that the remote NFC endpoint is no longer in the sleep sub-state. More particularly, processor 706, DH 760, and/or sleep flag processing module 774 of communications device 700 may be configured to reset the sleep flag.

With reference now to FIG. 6, an example flowchart describing a process 600 for providing improved activation and/or deactivation for communications with NFC-F based remote NFC endpoints. In an aspect, the process may be performed by a listening NFC device, such as, for example, remote NFC endpoint 330 of FIG. 3 and/or communications device 700 of FIG. 7, each of which may be in communication with an NFC polling device (e.g., remote NFC endpoint 330 is in communication with communications device 310, both of FIG. 3).

In an optional aspect, at block 602, a listening NFC device may receive a deselection message from a polling NFC device. In an aspect, communications device 700 may be configured to receive a deselection message from a polling NFC device. More particularly, receiver 702, processor 706, DH 760, and/or NFC-F device activation module 770, and/or NFC-F sleep sub-state processing module 776 of communications device 700 may be configured to perform such receiving. In an aspect, the deselection request may be a DSL_REQ message as defined by the NFC Forum Digital Protocol specification.

In an optional aspect, at block 604, the listening NFC device may switch from a ready sub-state to a sleep sub-state in response to reception of the deselection message. In an aspect, communications device 700 may be configured to switch from a ready sub-state to a sleep sub-state in response to reception of the deselection message. More particularly, processor 706, DH 760, and/or NFC-F device activation module 770, and/or NFC-F sleep sub-state processing module 776 of communications device 700 may be configured to perform such a switch.

At block 606, the listening NFC device may subsequently receive an attribute request message from the polling NFC device. In an aspect, communications device 700 may be configured to subsequently receive an attribute request message from the polling NFC device. More particularly, receiver 702, processor 706, DH 760, and/or NFC-F device activation module 770, and/or NFC-F sleep sub-state processing module 776 of communications device 700 may be configured to perform such receiving. In an aspect, the attribute request may be an ATR_REQ message as defined by the NFC Forum Digital Protocol specification.

At block 608, the listening NFC device may switch from the sleep sub-state back to the ready sub-state in response to reception and processing of the attribute request message. In an aspect, communications device 700 may be configured to switch from the sleep sub-state back to the ready sub-state in response to reception and processing of the attribute request message. More particularly, processor 706, DH 760, and/or NFC-F device activation module 770, and/or NFC-F sleep sub-state processing module 776 of communications device 700 may be configured to perform such a switch.

At block 610, the listening NFC device may transmit an attribute response message to the polling NFC device as part of a Device Activation procedure. In an aspect, communications device 700 may be configured to transmit an attribute response message to the polling NFC device as part of a Device Activation procedure. More particularly, transmitter 720, processor 706, DH 760, and/or NFC-F device activation module 770 of communications device 700 may be configured to perform such a transmission. In an aspect, the attribute response may be an ATR_RES message as defined by the NFC Forum Digital Protocol specification.

While referencing FIG. 3, but turning also now to FIG. 7, an example architecture of a communications device 700 is illustrated. Communications device 700 may represent a polling device, which may be the same as or similar to communications device 310 of FIG. 3, and/or a listening device, which may be the same as or similar to remote NFC endpoint 330 of FIG. 3.

As depicted in FIG. 7, communications device 700 includes receiver 702 configured to receive a signal from, for instance, a receive antenna (not shown), perform typical actions (e.g., filters, amplifies, downconverts, etc.) on the received signal, and digitize the conditioned signal to obtain samples. Receiver 702 may comprise a demodulator 704 configured to demodulate received symbols and provide them to processor 706 for channel estimation. Processor 706 may be a processor dedicated to analyzing information received by receiver 702 and/or generating information for transmission by transmitter 720, a processor that controls one or more components of communications device 700, and/or a processor that both analyzes information received by receiver 702, generates information for transmission by transmitter 720, and controls one or more components of communications device 700. Further, signals may be prepared for transmission by transmitter 720 through modulator 718 configured to modulate the signals processed by processor 706.

Communications device 700 may additionally include memory 708 operatively coupled to processor 706 and configured to store data to be transmitted, received data, information related to available channels, TCP flows, data associated with analyzed signal and/or interference strength, information related to an assigned channel, power, rate, and/or the like, and/or any other suitable information for estimating a channel and communicating via the channel. It will be appreciated that any data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 708 of the subject systems and methods may comprise, without being limited to, these and any other suitable types of memory.

Additionally, communications device 700 may include user interface 740. User interface 740 may include input mechanism 742 for generating inputs into communications device 700, and output mechanism 744 for generating information for consumption by a user of the communications device 700. For example, input mechanism 742 may include a mechanism such as a key or keyboard, a mouse, a touch-screen display, a microphone, etc. Further, for example, output mechanism 744 may include a display, an audio speaker, a haptic feedback mechanism, a Personal Area Network (PAN) transceiver etc. In the illustrated aspects, the output mechanism 744 may include a display operable to present media content that is in image or video format or an audio speaker to present media content that is in an audio format.

Communications device 700 may include NCI 750. In one aspect, NCI 750 may be operable to enable communications between DH 760 and NFC controller 730.

Communications device 700 may further include NFC-F device activation module 770 configured to facilitate efficient communications with a remote NFC endpoint that is supported by NFC-F technology and that may be in a sleep sub-state. In an aspect, NFC-F device activation module 770 may include sleep flag processing module 774 configured to set a sleep flag when a deselection request (DSL_REQ) message is sent to a remote NFC endpoint supported by NFC-F and/or NFC-A access technologies. In another aspect, where the remote NFC endpoint is to be activated as a type 3 tag after having previously being deselected, sleep flag processing module 774 may be configured to clear a sleep flag that was previously set during the device deactivation procedure. Further, sleep flag processing module 774 may be configured to clear a previously-set sleep flag upon successful reactivation of the remote NFC endpoint. Still further, upon a sleep flag being set, and if NFC-F device activation module 770 determines to use an NFC-F access technology according to an NFC-DEP to communicate with a remote NFC endpoint, sense request message module 772 may be configured to send a sense request for NFC-F (e.g., SENSF_REQ) before sending an attribute request message. In such an aspect, the sense request message allows the remote NFC endpoint to switch from a sleep sub-state to a ready sub-state, which in turn allows the remote NFC endpoint to successfully receive and process the attribute request message.

In an aspect in which the communications device 700 is a listening NFC device (e.g., remote NFC endpoint 330), NFC-F sleep sub-state processing module 776 may be configured to receive and process an attribute request (e.g., ATR_REQ) message as part of a device activation procedure. Also in such an aspect, in response to receipt of the attribute request message, NFC-F sleep sub-state processing module 776 may allow the communications device 700 to switch from a sleep sub-state to a ready sub-state. Upon completion of the switch, NFC-F sleep sub-state processing module 776 may be configured to send an attribute response (e.g., (ATR_RES) message to an NFC polling device.

Further, processor 706, DH 760, and/or NFC-F device activation module 770 may be, or include, means for determining that a remote NFC device that is supported by an NFC-F access technology was previously deactivated, and means for transmitting a sense request message to enable the remote NFC device to receive an attribute request message as part of a device activation procedure.

In another aspect, processor 706, DH 760, and/or NFC-F device activation module 770 may be, or include, means for setting a sleep flag to indicate that a deselected remote NFC device is in a sleep sub-state, means for determining that the remote NFC device is to be activated as a type 3 tag as part of a device activation procedure, and means for resetting the sleep flag to indicate that the remote NFC device is no longer in the sleep sub-state based on the determination. In an aspect, the remote NFC device may be supported by an NFC-F access technology.

In still another aspect, processor 706, DH 760, and/or NFC-F device activation module 770 may be, or include, means for receiving an attribute request message from a polling NFC device, means for switching from the sleep sub-state to a ready sub-state in response to reception of the attribute request message, and means for transmitting an attribute response message to the polling NFC device as part of a device activation procedure. In such an aspect, the communications device 700 may be a listening NFC device that is supported by an NFC-F access technology and that is in a sleep sub-state.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, near-field communications (NFC-A, NFC-B, NFC-F, etc.), and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

The invention claimed is:

1. A method of inductive communications, comprising:
transmitting, by a polling near field communication (NFC) device, a deselection request message to deselect a remote NFC device as part of a device deactivation procedure;
setting, by the polling NFC device, a sleep flag to indicate that the remote NFC device is in a sleep sub-state;
determining, by the polling NFC device, based on the sleep flag associated with the remote NFC device supported by NFC-F access technology, that the remote NFC device is deactivated; and
transmitting, by the polling NFC device, in response to the determining that the remote NFC device is deactivated, a sense request message to the remote NFC device, wherein the sense request message enables the remote NFC device to receive an attribute request message as part of a device activation procedure.

2. The method of claim 1, further comprising:
resetting or clearing the sleep flag to indicate that the remote NFC device is no longer in the sleep sub-state based on the transmitting of the sense request message from the polling NFC device.

3. The method of claim 1, further comprising:
transmitting the attribute request message to the remote NFC device from the polling NFC device.

4. The method of claim 3, further comprising:
performing, by the polling NFC device, one or more communications with the remote NFC device as part of a data exchange procedure upon successful completion of the device activation procedure.

5. The method of claim 1, wherein the remote NFC device is configured to
communicate using an NFC data exchange protocol (DEP) (NFC-DEP).

6. A non-transitory computer readable medium storing computer executable code for inductive communications, comprising:
code for transmitting, by a polling near field communication (NFC) device, a deselection request message to deselect a remote NFC device as part of a device deactivation procedure;
code for setting, by the polling NFC device, a sleep flag to indicate that the remote NFC device is in a sleep sub-state;
code for determining, by the polling NFC device, based on the sleep flag associated with the remote NFC device supported by NFC-F access technology, that the remote NFC device is deactivated; and
code for transmitting, by the polling NFC device, in response to the determining that the remote NFC device is deactivated, a sense request message to the remote NFC device, wherein the sense request message enables the remote NFC device to receive an attribute request message as part of a device activation procedure.

7. An apparatus for inductive communications, comprising:
- means for transmitting, by a polling near field communication (NFC) device, a deselection request message to deselect a remote NFC device as part of a device deactivation procedure;
- means for setting, by the polling NFC device, a sleep flag to indicate that the remote NFC device is in a sleep sub-state;
- means for determining, by the polling NFC device, based on the sleep flag associated with the remote NFC device supported by NFC-F access technology, that the remote NFC device is deactivated; and
- means for transmitting, by the polling NFC device, in response to the determining that the remote NFC device is deactivated, a sense request message to the remote NFC device, wherein the sense request message enables the remote NFC device to receive an attribute request message as part of a device activation procedure.

8. A polling near field communication (NFC) device apparatus for inductive communications, comprising:
- a transceiver;
- a memory;
- a processor coupled to the memory; and
- an NFC-F device activation module coupled to at least one of the memory or the processor and configured to:
  - transmit, via the transceiver, a deselection request message to deselect a remote NFC device as part of a device deactivation procedure;
  - set a sleep flag to indicate that the remote NFC device is in a sleep sub-state;
  - determine, based on the sleep flag associated with the remote NFC device supported by NFC-F access technology, that the remote NFC device is deactivated; and
  - transmit, via the transceiver, in response to the determining that the remote NFC device is deactivated, a sense request message to the remote NFC device, wherein the sense request message enables the remote NFC device to receive an attribute request message as part of a device activation procedure.

9. The apparatus of claim 8, wherein the NFC-F device activation module is further configured to:
- reset or clear the sleep flag to indicate that the remote NFC device is no longer in the sleep sub-state based on the transmission of the sense request message from the polling NFC device.

10. The apparatus of claim 8, wherein the NFC-F device activation module is further configured to:
- transmit, via the transceiver, the attribute request message to the remote NFC device.

11. The apparatus of claim 10, wherein the NFC-F device activation module is further configured to:
- perform one or more communications with the remote NFC device as part of a data exchange procedure upon successful completion of the device activation procedure.

12. The apparatus of claim 8, wherein the remote NFC device is configured to communicate using an NFC data exchange protocol (DEP) (NFC-DEP).

* * * * *